United States Patent
Sohn et al.

(10) Patent No.: US 9,650,688 B2
(45) Date of Patent: May 16, 2017

(54) METHOD OF RECOVERING FE FROM STEEL-MAKING SLAG

(71) Applicant: Industry-Academic Cooperation Foundation, Yonsei University, Seoul (KR)

(72) Inventors: Il Sohn, Seoul (KR); SungSuk Jung, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 202 days.

(21) Appl. No.: 14/228,815

(22) Filed: Mar. 28, 2014

(65) Prior Publication Data
US 2015/0007696 A1 Jan. 8, 2015

(30) Foreign Application Priority Data
Jul. 4, 2013 (KR) .................. 10-2013-0078103

(51) Int. Cl.
| | |
|---|---|
| C22B 7/04 | (2006.01) |
| C21B 3/08 | (2006.01) |
| C21C 5/00 | (2006.01) |
| C21C 5/36 | (2006.01) |
| C21C 5/54 | (2006.01) |

(52) U.S. Cl.
CPC .............. *C21B 3/08* (2013.01); *C22B 7/04* (2013.01); *C21B 2200/00* (2013.01); *C21C 5/00* (2013.01); *C21C 5/36* (2013.01); *C21C 5/54* (2013.01); *Y02P 10/216* (2015.11)

(58) Field of Classification Search
CPC .... C22B 7/04; C21B 3/08; C21C 5/54; C21C 5/36; C04B 5/00
See application file for complete search history.

(56) References Cited

U.S. PATENT DOCUMENTS 4,009,024 A * 2/1977 Miller ...................... C21B 3/06
75/330

FOREIGN PATENT DOCUMENTS

| JP | 06-256814 A | * | 9/1994 |
| JP | 2006-144078 A | * | 6/2006 |
| KR | 10-2011-0077258 | | 7/2011 |
| WO | WO 0029071 A1 | * | 5/2000 |

OTHER PUBLICATIONS

Arai et al. JP 2006144078 A published Jun. 2006. Machine translation.*
Horii et al. JP 06256814 A published Sep. 1994. Machine translation.*

* cited by examiner

*Primary Examiner* — George Wyszomierski
*Assistant Examiner* — Tima M McGuthry Banks
(74) *Attorney, Agent, or Firm* — Lex IP Meister, PLLC

(57) ABSTRACT

A method of recovering Fe from steel-making slag is disclosed. The method includes the steps of melting steel-making slag having a higher Fe content than iron-making slag by heating the steel-making slag to a first temperature; cooling the molten slag to a second temperature that is lower than the first temperature and then maintaining the same at the second temperature for a predetermined time to thus precipitate Fe in the molten slag, thereby forming and growing an Fe-rich phase; rapidly cooling the slag to room temperature; and crushing the solidified slag and magnetically separating a magnetically-susceptible portion from a magnetically-unsusceptible portion.

2 Claims, 2 Drawing Sheets

US 9,650,688 B2

METHOD OF RECOVERING FE FROM STEEL-MAKING SLAG

CROSS REFERENCE TO RELATED APPLICATION

The present application claims priority from Korean Patent Application Number 10-2013-0078103 filed on Jul. 4, 2013, the entire contents of which are incorporated herein for all purposes by this reference.

BACKGROUND OF THE INVENTION

Field of the Invention

The present invention relates to a method of controlling the iron (Fe) content in slag, and more particularly, to a method of recovering Fe from steel-making slag (e.g. electric furnace slag) by effectively reducing the amount of Fe contained in the electric furnace slag.

Description of Related Art

Slag that occupies a significant fraction of a byproduct from the steel-making industry is used as a high value-added material through recycling in certain industrial fields, such as construction and engineering works. While iron-making slag that is also known as blast furnace slag has a low Fe content (less than about 1%), electric furnace slag that is introduced due to a change in the steel production system as well as converter slag that also belongs to the category of steel-making slag has a high Fe content ranging from about 20 to about 30 wt %. However, since applications of slag are limited, a significant amount of slag is buried, thereby causing pollution. In order to reduce the Fe content by recovering Fe from electric furnace slag, a method of recovering Fe from the electric furnace slag through a reduction operation inside the furnace and a magnetic separation method of separating minerals based on whether or not minerals are magnetically susceptible after leaked slag is solidified may be considered.

A method of recovering valuable metals from slag was disclosed (see Korean Patent No. 10-1175422). The method disclosed in this document involves recovering valuable metals using a reducing agent, crushing the slag after cooling, and recovering Fe by inducing a magnetic field. This method belongs to the category of a method of separating a specific element by melt-cooling. However, Fe is not efficiently recovered since a considerable amount of Fe content in the liquid phase is not absorbed.

The information disclosed in the Background of the Invention section is provided only for better understanding of the background of the invention, and should not be taken as an acknowledgment or any form of suggestion that this information forms a prior art that would already be known to a person skilled in the art.

Related Art Document

BRIEF SUMMARY OF THE INVENTION

Various aspects of the present invention provide a method of effectively recovering Fe from steel-making slag.

In an aspect of the present invention, provided is a method of recovering Fe from steel-making slag. The method includes the following steps of: melting steel-making slag having a higher Fe content than iron-making slag by heating the steel-making slag to a first temperature; cooling the molten slag to a second temperature that is lower than the first temperature and then maintaining the same at the second temperature for a predetermined time to thus precipitate Fe in the molten slag, thereby forming and growing an Fe-rich phase; rapidly cooling the slag to room temperature; and crushing the solidified slag and magnetically separating a magnetically-susceptible portion from a magnetically-unsusceptible portion.

According to an embodiment of the present invention, the first temperature may range from 1450° C. to 1600° C.

According to an embodiment of the present invention, the second temperature may range from 1150° C. to 1250° C.

According to an embodiment of the present invention, the slag may be maintained at the second temperature for 10 minutes or longer.

According to an embodiment of the present invention, in an isothermal cooling process at the second temperature, the Fe-rich phase may form and grow, the Fe-depleted liquid slag may be solidified into an amorphous phase, and Fe-rich slag and Fe-poor amorphous slag may be separated from each other by the magnetic separation.

According to an embodiment of the present invention, the steel-making slag may be electric furnace slag or converter slag.

As set forth above, it is possible to effectively recover a large amount of Fe contained in steel-making slag.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Figure 1:
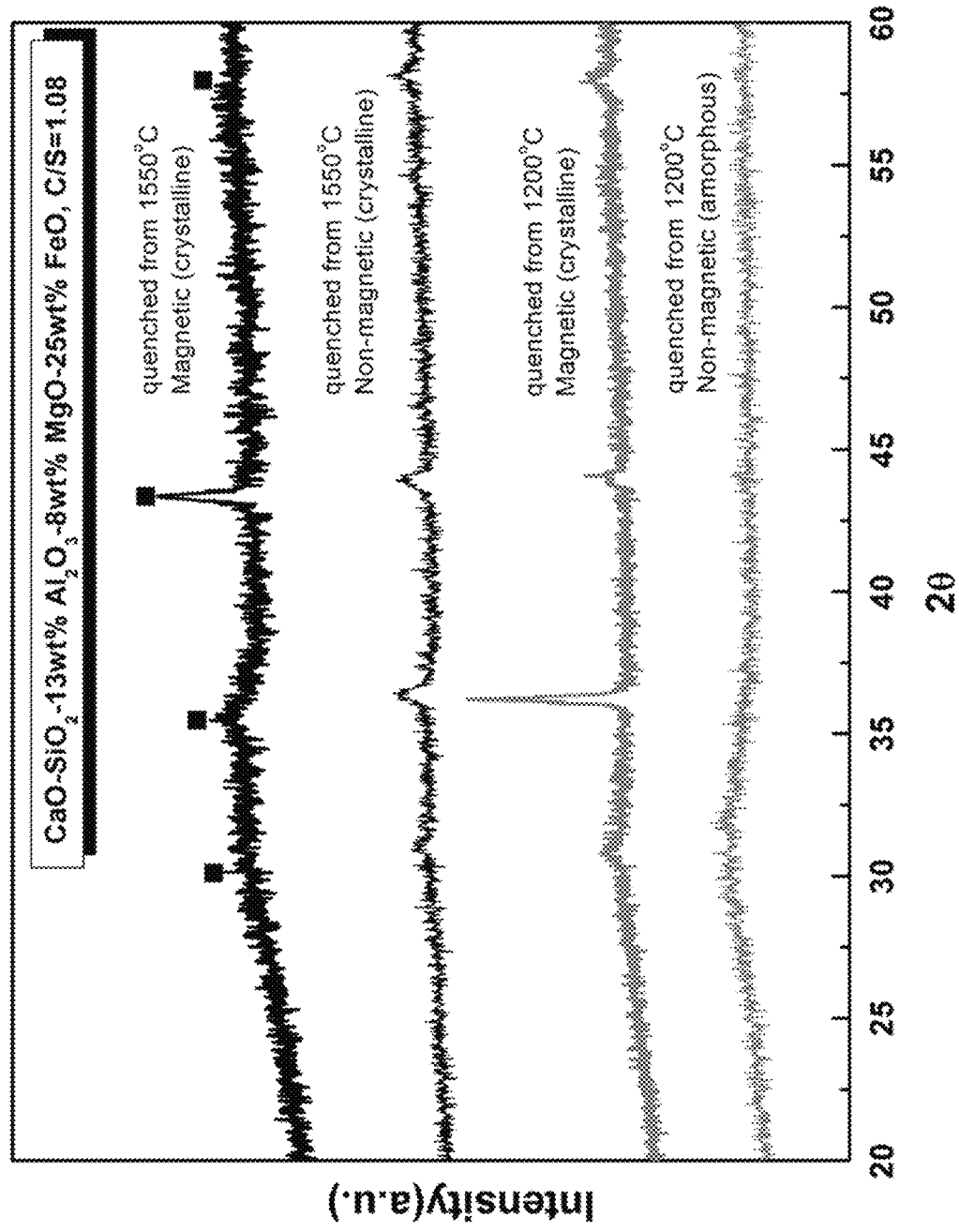
FIG. 1 is a graph showing X-ray diffraction (XRD) results of solidified slag formed according to a comparative example and an example of the present invention.

Reference will now be made in detail to exemplary embodiments of the present invention in conjunction with the accompanying drawings. Herein, detailed descriptions of some technical constructions or terms involving the recovery of specific elements from slag that are well known in the art will be omitted. Even if such descriptions are omitted, the features of the present invention will be apparent to a person skilled in the art from the following description.

The inventors have completed the present invention by studying and testing a method of significantly reducing the Fe content in electric furnace slag by allowing Fe in the slag to precipitate as a more abundant solid phase during cooling.

According to the results of tests that the inventors conducted, electric furnace slag can be solidified into two portions, i.e. a portion where Fe is densely-populated in the form of $MgAlFeO_4$ or $Fe_3O_4$ as primary crystals (Fe-rich phase) and a low Fe content portion consisting of an amorphous phase or a different type of phase, by suitable cooling treatment. At this time, if the molten slag is directly solidified at room temperature, the Fe-rich phase is formed at only a small ratio and a significant amount of the Fe content in the liquid phase is not absorbed into the Fe-containing solidified phase due to the limited time, thereby making it impossible to effectively recover Fe. However, when a relatively low temperature range (e.g. from about 1150° C. to 1250° C.) of the temperature range where the solidified phase can be formed is maintained isothermally for a predetermined time period, it is possible to increase the fraction of the solidified phase, thereby further reducing the Fe content in the liquid slag. That is, although the solidified phase can be precipitated at a temperature higher than 1250° C., for example, a temperature of about 1300° C., the fraction of the solidified phase is small. Therefore, since Fe that has not been absorbed yet mixes into a second solid phase while remaining in the liquid phase, it is not effective in terms of Fe separation. In addition, although a high-Fe content solidified phase is precipitated at an initial stage at a temperature lower than about 1150° C. on a solidification curve, since this phase is not thermodynamically stable, another phase starts to grow over time. It is thus difficult to maximize the precipitation of the phase intended in the present invention. Accordingly, it is preferred to conduct isothermal cooling in the above-mentioned temperature range. This will be described in more detail hereinafter in relation to detailed examples.

The inventors prepared a sample having a composition corresponding to that of electric furnace slag (28.04% CaO, 25.96% $SiO_2$, 13% $Al_2O_{3d}$, 8% MgO and 25% FeO), poured the sample into a platinum (Pt) crucible, loaded the crucible into a furnace, and heated the sample up to about 1550° C. at a heating rate of 100° C. per hour. The slag can be completely melted at a temperature above 1450° C., and the test was conducted at a temperature of 1550° C. in order to make the molten slag as uniform as possible. It is preferred that the processing be conducted at a temperature below 1600° C. since a slag pot may be excessively eroded at a temperature above 1600° C. in the actual process. The melting process was conducted in an argon (Ar) atmosphere. The slag that was completely melted at 1550° C. for about 3 hours was cooled down to about 1200° C. at a rate of 100° C. per minute, was isothermally cooled at this temperature for about 1 hour to form and grow a crystalline phase, and then was quenched (by water cooling) to room temperature. According to microscopic observation, a high Fe content solidified phase grew for about 10 minutes, but after that, neither new nor additional growth was observed. In order to maximize the formation of the high Fe content solidified phase, isothermal cooling was conducted for 1 hour. The isothermal cooling may be conducted preferably for 10 minutes or longer, and more preferably, in a time range from 10 to 30 minutes.

The solidified slag was pulverized to a powder having a size of about 45 μm or less using a ball mill, and magnetic separation was manually conducted using a magnet. Afterwards, the properties were examined by respectively analyzing the compositions of magnetic and nonmagnetic portions through X-ray fluorescence (XRF) and analyzing the solidified phase through X-ray diffraction (XRD). In addition, scanning electron microscopy (SEM) analysis and energy dispersive spectroscopy (EDS) analysis were conducted in order to observe the size and geometry of particles of the solidified phase. The inventors also analyzed the compositions by directly cooling the molten slag to room temperature without the isothermal cooling (a comparative example). The results are presented in Table 1 below.

TABLE 1

| Temp[1] | MS[2] | Contents (wt %) | | | | | | |
|---|---|---|---|---|---|---|---|---|
| | | O | Fe | Ca | Si | Al | Mg | Total |
| 1550 | O | 38.18 | 18.75 | 20.58 | 11.66 | 6.35 | 4.48 | 100 |
| | X | 38.18 | 18.61 | 20.48 | 11.60 | 6.70 | 4.42 | 100 |
| 1200 | O | 38.08 | 19.52 | 19.92 | 11.01 | 6.85 | 4.61 | 100 |
| | X | 39.15 | 11.54 | 25.95 | 14.52 | 5.96 | 2.88 | 100 |

Note)
Temp[1]: Temperature before quenching,
MS[2]: Magnetic susceptibility

In the comparative example in which quenching was conducted directly from about 1,550° C. to room temperature, there was no significant difference in the Fe content between magnetic matter (O) and nonmagnetic matter (X). In the molten slag of the comparative example, the effect of separating the Fe component by magnetic separation was insignificant. That is, although the results obtained from the solidified phase analysis indicate that the Fe-rich phase was also formed in the comparative example, there was no significant difference in the Fe content between the solidified phase and the nonmagnetic slag. This explains that Fe-rich primary crystals were formed in response to rapid nucleation in the entire liquid slag but the Fe-rich primary crystals coexist with the amorphous phase in the fine particle powder. Thus, it is impossible to easily separate the Fe component through the crushing and the magnetic separation.

In contrast, as described above, the present invention makes it possible to separate the Fe-rich slag and the Fe-poor amorphous slag from each other. Specifically, first cooling is conducted in an intermediate temperature range between the melting temperature and room temperature, for example, at 1200° C. Afterwards, isothermal cooling is conducted at this temperature, followed by cooling to room temperature. A large amount of Fe-rich primary crystals is formed through the isothermal cooling in the intermediate temperature range. When the isothermal cooling is conducted for a predetermined time, for example, 1 hour, the Fe-rich primary crystals grow while being densely populated, and most of the Fe-depleted liquid slag is solidified into an amorphous phase. Finally, the Fe-rich slag and the Fe-poor amorphous slag can be separated from each other through magnetic separation. Accordingly, the Fe content of the magnetic matter is higher than that of the nonmagnetic matter (see Table 1).

FIG. 1 shows X-ray diffraction (XRD) results of solidified slag formed according to a comparative example and an example of the present invention. Phase separation control was not easy for the solidified slag formed through quenching from 1550° C. (comparative example). In contrast, the solidified slag in which primary crystals were formed at 1200° C. (an example of the present invention) indicates that separation between crystalline and amorphous phases is clearly possible. Specifically, according to the phase separation results shown in FIG. 1, peaks explain that even the nonmagnetic portion of the solidified slag, which was obtained by quenching the molten slag directly from 1550° C., partially contains spinels. The results of magnetic separation in FIG. 1 explain no significant difference in the Fe content between the magnetic portion and the nonmagnetic portion. This suggests that a portion of the spinel phase formed during the quenching did not have strong magnetism in spite of its high Fe content and thus remained nonmagnetic. When quenched from the molten state, the crystals and amorphous phase are finely intertwined and coexist with each other even in minute regions. It is concluded that the crystalline peaks are found in the nonmagnetic portion since some crystalline structures, which were mixed in the amorphous portion during the separation after the crushing, cannot sensitively respond to magnetism. In contrast, in the slag that was maintained at 1200° C., all the portions containing spinels were magnetic, and only the nonmagnetic amorphous portions were separated.

Figure 2:
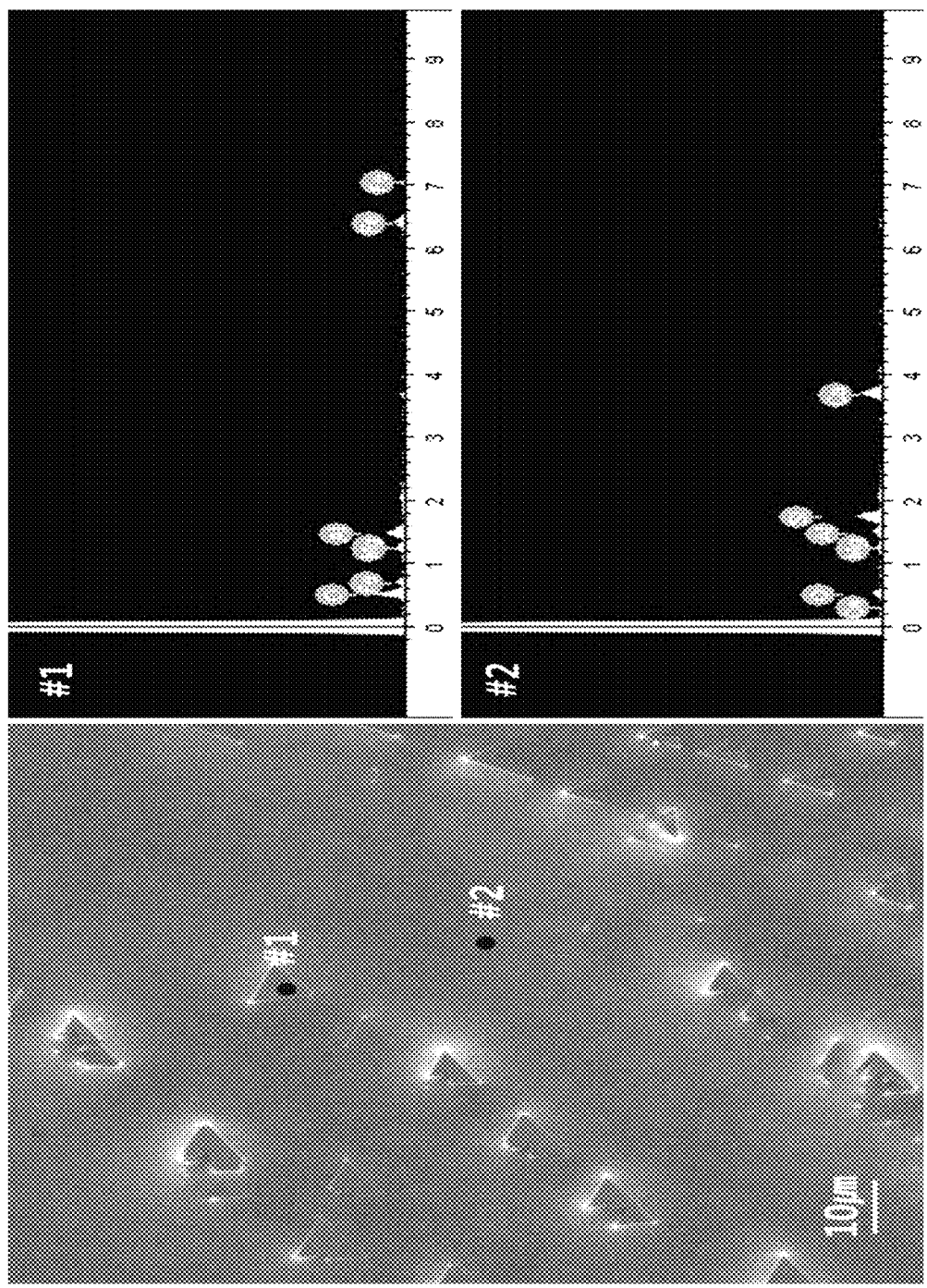
FIG. 2 is a view showing a scanning electron microscopy (SEM) image and X-ray spectrums of primary crystals formed at 1200° C. and an amorphous phase formed through quenching.

FIG. 2 shows a scanning electron microscopy (SEM) image and X-ray spectrums of primary crystals formed at 1200° C. and an amorphous phase formed through quenching. Referring to these images, precipitated primary crystals include Mg, Fe and Al, and the surrounding liquid phase has a composition in which Fe is substantially depleted.

Although the present invention has been described in relation to the certain exemplary embodiments, it should be understood that the present invention is not limited thereto. The foregoing embodiments can be made into various alterations and modifications without departing from the scope of the appended Claims, and all such alterations and modifications fall within the scope of the present invention.

Therefore, the present invention shall be defined by only the claims and their equivalents.

The invention claimed is:

1. A method of recovering Fe from a steel-making slag, the method comprising the following steps of:
    melting the steel-making slag having a higher Fe content than an iron-making slag by heating the steel-making slag to a first temperature ranging from 1450° C. to 1600° C. to make a molten slag;
    cooling the molten slag to a second temperature ranging from 1150° C. to 1250° C. and then maintaining the second temperature for 10 minutes or longer, thereby forming and growing an Fe-rich spinel phase and an Fe-poor amorphous phase;
    rapidly cooling the molten slag to room temperature to form a solidified slag after maintaining the second temperature for 10 minutes or longer; and
    crushing the solidified slag and separating a magnetically-susceptible portion from a magnetically-unsusceptible portion by applying a magnetic separation to the solidified slag,
    wherein, in maintaining the second temperature for 10 minutes or longer, the Fe-rich spinel phase is formed and grown, and the Fe-poor amorphous phase is formed from an Fe-depleted liquid slag, and
    wherein an Fe-rich slag from the Fe-rich spinel phase and an Fe-poor amorphous slag from the Fe-poor amorphous phase are separated from each other by the magnetic separation.

2. The method according to claim 1, wherein the steel-making slag is electric furnace slag or converter slag.

* * * * *